May 26, 1959

R. S. MASON 2,887,874

FILM SLIP TESTER

Filed March 8, 1956

INVENTOR.
Robert S. Mason
BY

Griswold & Burdick
ATTORNEYS

United States Patent Office 2,887,874
Patented May 26, 1959

2,887,874

FILM SLIP TESTER

Robert S. Mason, Midland, Mich., assignor to The Dow Chemical Company, Midland, Mich., a corporation of Delaware Application March 8, 1956, Serial No. 570,256

2 Claims. (Cl. 73—9)

This invention relates to a device for measuring the coefficient of friction between two layers of material which are in contact with each other, and particularly to a device which measures the "slip" between two adjacent layers of thin, electrostatically chargeable thermoplastic film.

In the manufacturing of articles from thin, clinging types of thermoplastic film, such as saran films (made of polymers and copolymers of vinylidene chloride) it is necessary that the film slide easily over machinery parts such as metal plates, for example. The ease with which the film slides or moves over a surface is referred to as the "slip" of the film. In the making of bags of saran film, for example, a certain amount of "slip" is required in order that the bag may be opened easily. In the case of saran films, the film is dusted with food starch to increase the "slip" of the film to the desired value. "Slip" is usually measured by rubbing two layers of film together and noting the force required to overcome the clinging together of the films and move the films with respect to each other. This measurement of slip has usually been accomplished by an inspector rubbing two layers of film between his fingers. Such means of measuring "slip" has resulted in confusion as to the "slip" requirements of different types of film due to wide variations in the standards of "slip" measurement adopted by various inspectors.

Accordingly, a principal object of this invention is to provide an improved device for measuring "slip" of films which eliminates the human element from the measuring operation.

In accordance with this invention there is provided a "slip" measuring device having a fixed member and a rotatable member between which the film layers to be tested are placed. The rotatable member is on a shaft which carries a coil spring which is affixed at one end to the shaft and at the other end to the rotatable member. A scale is coupled to the shaft. As the shaft is rotated, tension on the spring increases until the layers of film slip with respect to each other, allowing the rotatable member to rotate and release tension on the spring. The scale position at the time the "slipping" occurs is an indication of the "slip" of the film tested.

Figure 1:
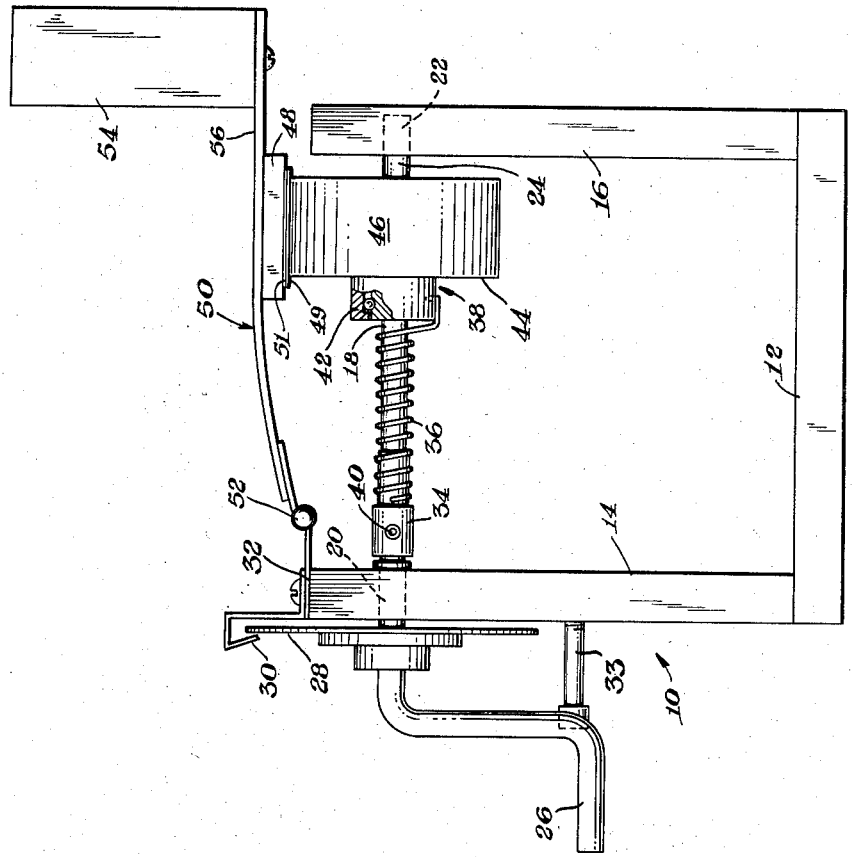
Figure 2:
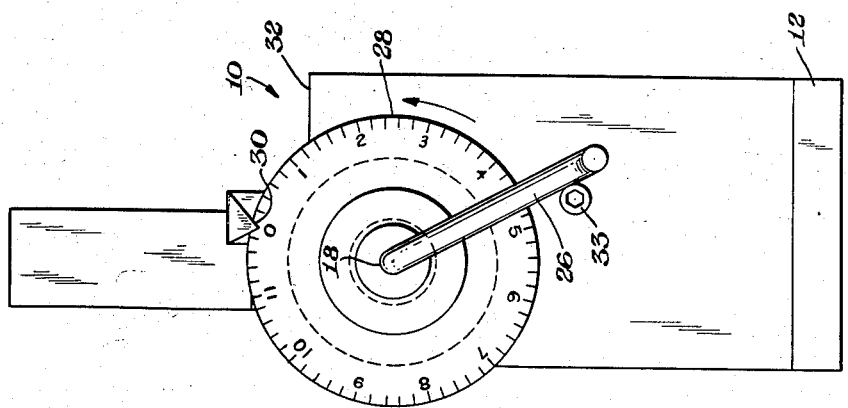

The invention, as well as additional objects and advantages thereof, will best be understood when the following detailed description is read in connection with the accompanying drawing, in which:

Figure 1 is a side elevational view of a "slip" measuring device in accordance with this invention, and Figure 2 is an end elevational view of the device shown in Fig. 1.

Referring to the drawings, there is shown a "slip" measuring device, indicated generally by the numeral 10. The device 10 includes a base 12 and two upright members 14, 16 secured to the base. The upright members 14, 16 are perpendicular to the base and support a shaft 18 which extends between the members 14, 16. The shaft 18 passes through a bore 20 in the upright member 14 and rests in a bore 22 in the upright member 16. The bore 22 does not extend through the member 16, but serves to support the end 24 of the shaft 18 and to limit rearward axial movement of the shaft 18. The diameter of the bores 20, 22 is large enough to permit the shaft 18 to rotate easily, but is small enough to prevent "jumping" of the shaft 18 which would hinder the smooth operation of the device 10. The end of the shaft 18 which extends through the bore 20 is bent to form a crank 26. A circular plate 28 carried by the shaft 18 has a scale printed or engraved thereon. A scale indexing marker 30 is affixed to the upper end 32 of the upright member 14 and extends downwardly in front (on the crank side) of the scale 28. A stop element in the form of a bolt 33 extending from the upright member 14 is provided to prevent the crank 26 being turned more than one revolution.

A bushing 34, coil spring 36, and ball bearing indicated generally by the numeral 38, are carried by the shaft 18. The bushing 34 is fixedly secured to the shaft 18 (by set screw 40) and is disposed adjacent to the upright member 14 to limit forward axial movement of the shaft 18.

The coil spring 36 is affixed at one end to the shaft 18 and at the other end to the outer race part 42 of the bearing 38. A cylindrical member 44 is mounted on and coaxially with the outer race 42, being fixedly secured thereto. The cylindrical member 44 has a smooth outer peripheral surface 46 (usually of rubber) which has greater frictional resistance to the material being tested than do adjacent sheets of the material being tested. Stated differently, when the surface 46 is rubbed against the film being tested, the coefficient of friction between the surface 46 and the film being tested must be greater than the maximum coefficient of friction which is to be encountered in measuring the "slip" between adjacent sheets of thin, clinging film.

A brake shoe 48 having a flat surface of rubber, for example, is mounted on the under side of a brake shoe arm 50 which is pivotally mounted at one end thereof the upright member 14 by means of the hinge 52. A weight 54 is carried on the upper side 56 of the brake shoe arm 50.

In operation, two layers 49, 51 of the film which is to be measured for "slip" characteristics are placed between the cylindrical member 44 and the brake shoe 48, the weight 54 causing the two layers of film to be pressed together between the member 44 and the brake shoe 48.

The crank 26 is then turned counter-clockwise, the direction which winds up the spring 36, until the torque applied to the member 44 through the spring 36 is sufficient to overcome the "slip" between the layers of material being tested and rotate the cylindrical member. The position of the scale of the circular plate 28 with respect to the marker 30 is noted. The scale index point at which the "slip" occurs is the "slip" reading for the material being tested.

Knowing the degree of "slip" of thin, clinging films is important because if the "slip" is too great, too much starch or other powder has been applied to the film, and the excess starch or powder collects on and eventually clogs the rolls of bag making or other machinery through which the film passes. Too small an amount of slip results in the film not sliding easily over metal machine parts due to the clinging of the films.

The brake shoe 48 lies flat against the periphery of the cylindrical member 44, making at least a line contact with the member 44. In one "slip" measuring device which was tested, a 500 gram weight 54 is used. In a specific embodiment of the invention the spring 36 develops a tangential force of 200 grams at the periphery of the member 46 when the crank 26 is rotated 300 degrees. Under such conditions normally starched saran film tested "slipped" at between 6.0 and 7.5 on a circular scale which was uniformly divided between 0 and 12.

It is recognized that in testing various materials changes in the weight 54 and spring 36 may be required in order that "slip" of the material occur at a convenient point along the scale.

I claim:

1. A film slip testing device for determining the slip between juxtaposed strips of film, said device comprising a base, a pair of upright members rigidly secured to said base, a rotatable shaft, said shaft extending between said upright members and being carried thereby, a ball bearing having an inner race and an outer race, the inner race of said bearing being carried on said shaft, a cylindrical friction member having a curved wall surface, said surface having a coefficient of friction with respect to said film which is greater than the coefficient of friction between said juxtaposed strips of film, said friction member being coupled to and disposed around said bearing, a coil spring, said spring being coiled around said shaft and disposed between said upright members, one end of said spring being fixedly secured to the outer race of said bearing and the other end of said spring being fixedly secured with respect to said shaft, a brake shoe supporting arm, said arm extending between said upright members and being pivotally coupled with respect to one of said upright members, a brake shoe, said brake shoe being secured to said arm and adapted to bear against the curved wall surface of said cylindrical friction member in line contact therewith, the part of the brake shoe which the cylindrical friction member and the film having a greater coefficient of friction than said juxtaposed strips of film, said friction member and said brake shoe being the elements between which film strips are positioned for testing, an indicator scale, said scale being coupled to said shaft, and means for rotating said shaft.

2. A film slip testing device in accordance with claim 1, wherein a weight is secured to said brake shoe supporting arm.

References Cited in the file of this patent

UNITED STATES PATENTS

| | | |
|---|---|---|
| 1,184,880 | Schleher | May 30, 1916 |
| 1,887,527 | Spindel | Nov. 15, 1932 |
| 2,091,022 | Stuart | Aug. 24, 1937 |

OTHER REFERENCES

Publication: Journal of Applied Physics, September 1955, "Friction of Teflon Sliding on Teflon" by Flom et al., pages 1088–1092.